Patented Nov. 19, 1940

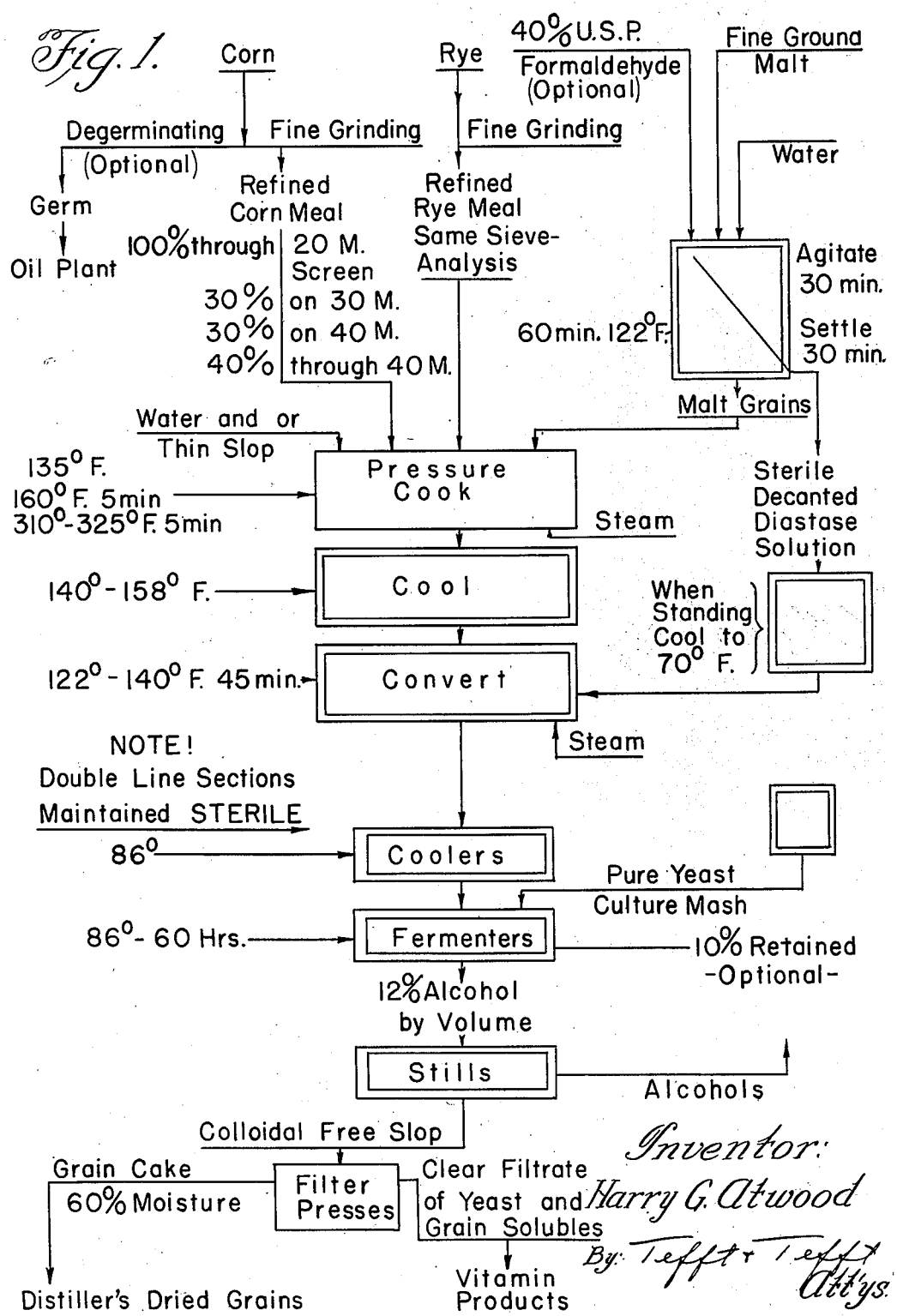

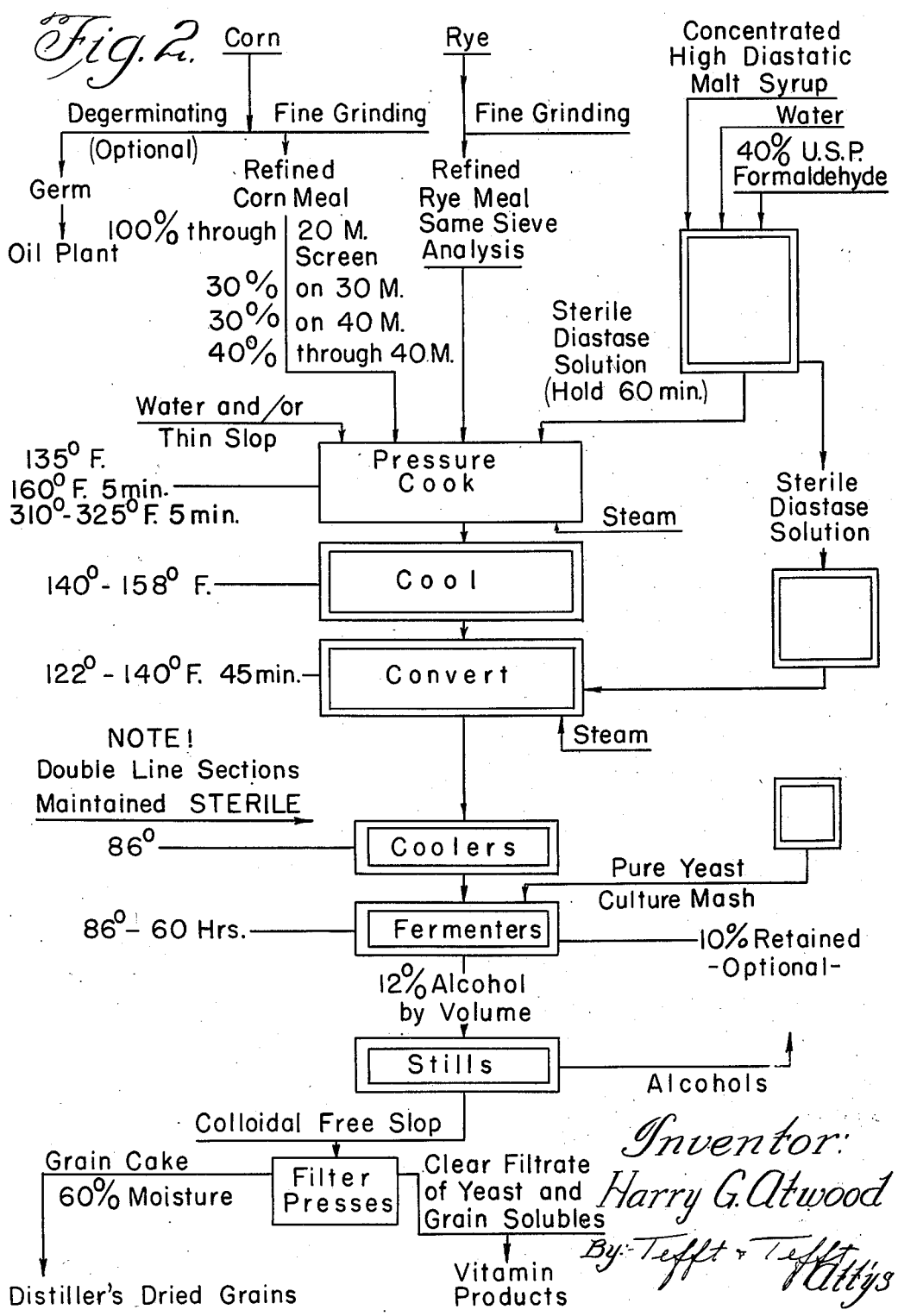

2,222,306

UNITED STATES PATENT OFFICE 2,222,306

METHOD OF PROCESSING CEREALS FOR RAPID FILTRATION AND RECOVERY OF GRAIN SOLUBLES

Harry G. Atwood, Peoria, Ill.

Application June 3, 1940, Serial No. 338,467

5 Claims. (Cl. 99—11)

This invention relates to improvements in the art of processing cereal and malted grains such as are employed in the food products, brewing, distilling, or like industries, and its general object is to improve the over-all efficiency and economy of these processes. Although the invention has broader application, it may be fully disclosed and will be described as applied to the process of producing bourbon and rye whiskies and/or spirits.

Heretofore the conventional process for producing alcohol from grain employed the cooking of coarsely ground cereal grains with water varying from atmospheric pressure or 210° F., or in some instances in pressure cookers to pressures of about 65 lbs. or temperatures of 310° F. Heretofore rye was cooked atmospherically only, because the large percentage of gums present in rye presented a cooked mash so viscous in character as to preclude any possibility of pressure cooking with the subsequent pressure release without great losses of entrained cooked rye mash. The ground rye was generally cooked at 158° F. separately from the corn and afterwards converted in the cooker, cooled and mixed with the cooked and converted corn mixture in the fermenter. This low temperature of rye cook resulted in an incomplete modification of the rye and malt starches and other products, resulting in a low alcohol yield as well as excess fusel oil in the distillate. Undesirable micro-organisms and spores were not destroyed during the old rye cooking temperatures. The viscous character of the mash produced under the old cooking procedure resulted in the building up of high foam heads during fermentation and my process eliminates this. Using the old process it was necessary to coarsely grind the corn so as to provide a corn bran flake which would serve as a filter bed on the slop screens and slop presses used later for the separation of grain fiber and the suspended solids from a de-alcoholized slop, leaving the stills. This coarse grind caused a loss in alcohol yield due to incomplete conversion, as indicated by appreciable quantities of unconverted raw starch in the cooked and fermented mash and in the de-alcoholized slop. The presence of appreciable quantities of unconverted modification products,—raw starch, dextrins, etc., obstructed the recovery of spent grains except at great expense for power, labor, steam and other allied costs. The slop leaving the stills was viscoidal in character to an extent that it was impossible to effect satisfactory economical separation of the suspended solids. Such slop creates a serious disposal problem, particularly in the face of a growing demand for more stringent laws against pollution of streams and the like.

During the cooking period the power required to thoroughly mix the mash was very high due to the stiffness of the mash, and since the mash was stiff and viscoidal after conversion, it required great pressure and power to pump the mash through the mash coolers. Moreover, the low heat transfer characteristic of this viscoidal mash necessitated the use of large quantities of cold water for cooling purposes.

In old fermenting processes (open wood tubs) it was impossible to start at the optimum temperature of 86° F. best suited for yeast fermentation; therefore it was necessary to set a fermenter at a very low temperature in order to avoid an end temperature which would be detrimental to yeast activity, the result being a retarded fermentation due to the low starting temperature (73 to 76° F.) employed.

Distillery conversion temperatures used in the past on ruptured starch ranged from 140–160° F. as these temperatures, although unfavorable for the optimum diastatic activity of the malt and production of the largest amount of fermentable sugars, were necessary to reduce the undesirable micro-organisms present in the malt.

When the cooked grain mash was converted at relatively low temperatures which were most suitable for malt enzyme efficiency, the temperature was not effective in rupturing the starch contained in the malt.

In conversions made at temperatures higher than 140° F. more malto-dextrin and dextrin are formed as the action of the saccharifying amylase is retarded by higher temperatures. At optimum temperature range from 120–140° F. the action of the saccharifying diastase is less restricted and the malto-dextrins immediately hydrolyzed to maltose sugar which is readily converted by the yeast into alcohol and carbon dioxide gas.

In comparison, my conversion process of converting the preliquefied cooked grain mash can be made at a more desirable conversion temperature of 120° F. as the undesirable living micro-organisms have been previously eliminated from the malt, resulting in the production of more fermentable sugars and the preservation of the diastatic activity of the malt for further conversion during fermentation.

In the old process after the mash was cooled and inoculated with yeast for fermentation, the fermentation was slow due to the incomplete conversion of the coarse grain which never did completely ferment, as indicated by a distinct blue color re-action with iodine in the de-alcoholized slop after distillation and also by the presence of appreciable quantities of reducing substances, as indicated by chemical analysis.

The heat of fermentation reaction in the fermenter was very high and required a low yeast inoculating temperature and great quantities of cold water to keep the temperature of the fermenting mash within limits which the yeast could endure without being rendered inactive or ineffective in its alcohol-producing capacity.

Following distillation, the recovery of by-product solids and solubles contained in the slop was slow, laborious and expensive due to the viscoidal character of the slop and the incomplete conversion of starch. The recovery of by-products from distillery slop, of the viscoidal character above described, has been the constant object of engineers and inventors for many years. The results have been comparatively unsatisfactory because the viscoidal nature of the slop defeated profitable recoveries. It is generally recognized in the filter art that none of the conventional methods of filtration can be successfully applied to material of this character.

As stated at the outset, the particular object of the present invention is to improve the art of processing cereal and malted grains such as are employed in the brewing, food products, distilling, and like industries to attain a better overall efficiency and economy of these processes.

Another object is to provide a process wherein the mash solutions are retained in a comparatively fluid and mobile colloidal-free state in order to reduce the cost of processing and handling and whereby valuable by-products may be economically reclaimed from the residue slop.

A further object is to improve the quality of the product by eliminating undesirable living organisms and spores by a method which may be effectively controlled to produce high uniform alcohol yields of excellent quality.

And a still further object is to employ mash solutions of higher concentrations than previously used in order to increase the capacity of the equipment and to reduce the power, steam, water, and labor costs.

In the present or conventional method of processing cereals or malted grains or solutions of the same for the distillation of alcohol much of the process was carried on in open vessels at temperatures too low to kill undesirable microorganisms or spores with the result that many undesirable living microorganisms or spores were introduced into the fermentation and yeast propagation creating side reactions and effects which reduced the yield of alcohol, and, varying with the effect of these side reactions, non-uniform results were obtained. These side reactions which were the result of infections caused by the presence of undesirable living microorganisms, introduced variables which complicated the process, no control being possible when these were once introduced, resulting in irregularity in the quantity and quality of the alcohol produced.

One of the main objects of my invention is to provide a process for the manufacture of alcohol, which is simpler in operation than the old process and yet, which provides a higher uniform yield of purer alcohol. To effect this result, I arrange to preclude any possibility of introducing living undesirable microorganisms or spores into the fermentation process, and in carrying out my invention, I provide, first, to sterilize all the grains and other materials which enter into my process and then carry the product through a closed sterile process system that results in a pure culture yeast fermentation process free of undesirable living organisms.

I may elect in following my process to retain a proportion of the fermented beer to provide the necessary supply of yeast for subsequent fermentation, thus enabling the carrying out of a continuous fermentation process. This continuous fermentation method has been employed on occasion in the past but had to be discarded due to the accumulation of undesirable living microorganisms which contaminated the entire subsequent fermentation process. As previously stated where the fermentation process had become infected through the presence of these living undesirable microorganisms, their life and growth could not be destroyed.

I do not need to especially culture and propagate yeast for each fermentation, but can hold back a portion of the fermented beer as a pure culture yeast inoculation and effect a continuous fermentation free of undesirable living organisms which produces higher and more uniform yields of alcohol. In addition, I am also able to employ grain mashes of higher grain concentrations than heretofore believed possible.

The completeness and speed of any reaction depends to a great extent on the fineness or sub-division of the products entering into the reaction. Therefore, in my process, I first prefer to effect a very fine grain of the cereals, for instance, I employ a finely ground corn with a preferred sieve analysis of 100% of the material passing through a 20 mesh screen, 30% on 30 mesh, 30% on 40 mesh, 40% through 40 mesh,— (although other starch or sugar containing materials may be used). Of course, this precludes any possibility of using the corn bran flake as a filter bed, but inasmuch as I propose to eliminate the viscoidal character of the slop, I am able to filter the slop by the conventional filter methods heretofore found impossible of operation on conventional slops. This very fine grind of the cereals results in a more complete cooking and conversion, thereby yielding a mash for distillation with a higher yield of alcohol than heretofore obtained. The mash is further made more fluid and mobile due to the fact that it is preliquefied through the use of a diastase containing material introduced into the cooker as malt grain residue from a decanted diastase solution, or otherwise,—which will be explained in greater detail later. This preliquefaction of the mash before atmospheric or pressure cooking has a very important bearing on my invention, and I have discovered a method whereby this liquefaction can be accomplished uniformly and effectively to produce a very fluid and mobile mash that can be easily pumped through mash coolers at pressures only fifty percent as high as is necessary to employ with mash from the old process, and for the same reason the power required for agitating the mash in the cooker is greatly reduced, in fact, the power requirements required in my new process rarely reach seventy-five percent of the power required under the old process. Moreover, this fluid-mobile mash has far greater heat conductivity, and thus substantially less water is required in the mash coolers and fermenters.

In the old process it was necessary to use low yeast inoculation temperatures due to the large amount of heat evolved during the labor of transforming sugars into alcohol, but in my process I start with a yeast inoculating temperature of 86° F. and hold this temperature through the entire fermentation period. Since it is not necessary to cool to a low inoculating temperature, much less water is used for cooling, and the higher heat conductivity effects more rapid heat transfer, which results in a substantial saving in both time of fermentation, and the amount of cooling water required. It is well known in the art that at higher temperatures the speed and completeness of a diastase conversion of starch and dextrin into sugars is accelerated. This more favorable higher temperature also effects a shorter time and completeness of the fermentation. When higher temperatures are mentioned in this instance they apply to the difference between the old setting temperature of 73–76° F. and the temperature of 86° F. which I employ. In my process only sterile products are fermented, no infection being possible in the previously sterilized closed fermentation system. As a result, I attain a clean fermentation, free of undesirable living micro-organisms, and thus produce a higher and more uniform yield of purer alcohol than has heretofore been obtained.

I do not find it necessary to provide for the production of lactic acid or to add any chemical antiseptic reacting substance during the yeast propagation or fermentation period, as was necessary under the old procedure. Generally under the old process it was necessary to adjust the acid concentration of the fermenter and yeast mash through the introduction of organic or inorganic acids or the development of lactic acid by a special lactic acid culture developed at the expense of a portion of the available sugars thus reducing the alcohol yield. This procedure, of course, was necessary when using the old process to hinder the development of undesirable living organisms that were introduced into the fermenter mash by way of the contaminated malt and rye grain previously not pressure cooked or sterilized.

I prefer to use a chemical antiseptic reacting substance to sterilize the malt infusion, such as forty percent U. S. P. formaldehyde in the proportion of one part formaldehyde to 800 parts of water, although I realize that the malt infusion may be sterilized by other chemical means or ultra-violet light, ultra-filtration, oligodynamic metal, heat or combinations of these.

Due to the completeness of the conversion and subsequent fermentation, all starch products have been transferred into alcohol and carbon dioxide, leaving a residue after distillation, which does not show a blue color reaction with iodine, and which when dried is higher in protein than any residues obtained under the old process.

The efficiency and completeness of my process produces practically the theoretical maximum alcohol yields.

The de-alcoholized slop from the stills is of such fluid colloidal-free nature that it can be readily filtered in any form of conventional filter, resulting in a hard, dry cake containing an average of 60 percent of moisture and a filtrate, free of suspended solids. The filter cake is dried and produces a cattle feed of higher protein value than in the old process. The filtrate may be further separated into its constituents concentrated and/or dried, yielding vitamin containing products suitable for animal feed and/or human food purposes.

Having thus explained my invention, I will now describe it as applied to the production of bourbon whiskey. Reference will be had to the drawings (Fig. 1) which diagrammatically chart the process as I apply it.

I take 9,638 pounds of finely ground corn, with a preferred sieve analysis of 100% of the material to pass through a 20 mesh screen, and 70% through a 30 mesh screen, and 2,408 pounds of finely ground rye of the same sieve analysis which are mixed in the cooker with 17,500 pounds of water at a preferred initial temperature of 135° F. (although temperatures of plus or minus 10° can be used) and to this I prefer to add the malt grain residue obtained from a mixture of 1,487 pounds of ground distillery barley malt previously mixed in 10,854 pounds of water which was agitated and then settled, held 30 minutes at 122° F.; to the malt water mixture there having been added 3,325 grams of 40% U. S. P. formaldehyde. From the settled malt-water mixture approximately 6,400 pounds supernatant sterilized diastatic liquid is decanted and held in a sterile closed cooled container for future conversion use. If this liquid is left standing, it is maintained at 70° F. The cooker is closed and steam admitted through suitable connections and the temperature gradually increased to 160° F. at which temperature the mash is held for 5 minutes to effect liquefaction. This is a very important reaction to effect, as cooks made in this manner are more fluid, mobile, and easily handled. The steam is again turned on after this period and the temperature raised in about 20 minutes to 325° F., at which temperature it is held 5 minutes, to effect complete gelatinization of all the starch granules. I prefer to use the above ratio of pounds of materials to pounds of water, temperatures, decanting the diastase solution, etc., although I realize that these may be varied proportionately to fit variable conditions. The pressure is now reduced and the temperature lowered by suitable means to 158–140° F. and I now introduce the cool sterile decanted diastase solution previously separated from the malt-water mixture, further reducing the temperature of the cook 18°–20° F., at which temperature it is held 45 minutes to effect modification and conversion of the starch contained in the finely ground pressure cooked grain substances. It is to be especially noted that in my process all grain substances are pressure cooked, thereby completely gelatinizing the starch contained in the malt as well as the starch contained in the rye and corn and eliminating any possibility of introducing any living micro-organisms or spores into the mash.

I thoroughly appreciate that concentrated malt syrups (or the like) of high diastatic activity may be utilized in my process for the production of diastase solutions. I illustrate diagrammatically the substitute use of such materials in Fig. 2.

I further appreciate the fact that diastatically active syrups are on the market and available for such use, with an important modification. Such syrups commonly contain undesirable micro-organisms which should be eliminated before introduction into sterile distilling systems, in accordance with my disclosure. This may be accomplished by conventional filtering methods or more effectively and economically by my preferred formaldehyde method as previously described.

It will be appreciated that the use of these syrups eliminates all of the malt grains introduced in the preferred embodiment of my invention as described. Naturally this reduces the alcohol and grain cake yield and thus varies the production economies.

However, I specifically desire to point out and teach that my process contemplates the use of a sterile diastase from a water infusion of cereal malt such as barley, corn, wheat or the like, a concentrated solution of the same or a concentrated syrup of high diastatic activity.

Although both temperature and times as above described may be varied or modified, I have described what my experience indicates as the optimum conditions and I desire to point out and teach as a disclosure of my invention that to obtain liquid and mobile mashes of high concentrations and to eliminate the viscoidal character of the de-alcoholized slop it is necessary to recognize a relatively low preliquefying temperature (as described about 160° F.) and to hold this temperature for a relatively short space of time (5 minutes) to effect liquefaction and then quickly raise the temperature to 310°–325° F. holding it for a short space of time (5 minutes) to effect complete gelatinization and then immediately to release the steam pressure and reduce the temperature to about 140°–158° F.

The modified and converted mash is now cooled to 86° F. and delivered through a sealed pipe line previously sterilized to a sealed and previously sterilized closed fermenter. To this mash is added previously prepared pure culture yeast and the entire mixture completely fermented within 60 hours at 86° F. At the end of fermentation 10% of the fermenter may be held back and reserved for the start of a new fermentation and this procedure continued indefinitely. I realize that the above temperatures and time may be varied although I prefer to use the ones stated as the optimum.

The temperature rise due to the heat of fermentation reaction is definitely lower than in the old process, due to the total absence of the heat developed by side reactions which result from an infected fermentation and the absence of alcohol oxidation which is proven through the very high alcohol yield obtained from my process approaching the theoretical maximum. In all comparative fermentation yields to date the alcohol obtained by using my process is uniformly 5% higher than that recovered under the old process.

The volume in the fermenter to a 56 pound bushel of grain used in the old process can be assumed to range between 35 to 45 gallons with 40 gallons representing a fair average. In my process I work with much more concentrated mashes and actually operate with a fermenter volume of 20–24 gallons to each 56 pound bushel of grain resulting in a beer in which the alcohol content at the end of fermentation consistently equals 12% alcohol by volume on a bourbon mash. This is about a 50% increase in alcohol concentration over the old process.

Since a bushel of corn is represented by a volume of 20–24 gallons of mash in the fermenter the steam requirement at the still is proportionately less when compared with a volume of 40 gallons per bushel in the fermenter employed in the old process.

The side reactions resulting in the formation of fusel oils, aldehydes, etc. are not as great as in the old process and chemical analyses indicate that by my process the fusel oil content of the distillates have been reduced by 30% as compared to the old process. While a 30% reduction in fusel oil is obtained in bourbon manufacture, I do effect a reduction of 50% of the fusel oil content of rye whiskey.

Aside from a material steam savings at the stills there is naturally a corresponding saving in the volume of cold water used on the still condensers.

The spent slop leaving the stills from my process has no blue color reaction with iodine indicating a total absence of free starch and when refermented shows only a trace of alcohol.

The slop leaving the stills filters freely leaving a cake residue which contains on the average only 60% moisture as compared to 75% moisture using the old process.

Assuming an average yield of 16 pounds of commercial dry distillers grain per bushel of grain mashed, the following remarkable steam savings are effected at the dryers:

*Old process*

16 pounds feed 10% water____ 14.4 pounds dry substance.

14.4 pounds dry substance_____ 57.6 pounds 75% moisture feed.

16 pounds 10% feed produced__ 16.0

41.6 pounds water evaporated in dryer per bushel of corn.

*My process*

13.0 pounds dry substance____ 32.5 pounds 60% moisture feed.

14.4 pounds 10% moisture feed produced_____ 14.4

18.1 pounds water evaporated in the dryer per bushel of corn.

The difference per bushel of corn is 23.5 pounds of water to be evaporated and assuming 60% efficiency at the dryer 39.11 pounds additional steam is required per bushel with the old process.

By chemical analyses the distiller's dried grain produced under my process contains on the average at least 8% more protein than the distiller's grain produced under the old process. Using my process the filtrate from the feed filter press contains 22 micro-mg. per dry gram of riboflavin. Formerly due to the presence of large quantities of suspended solids and the colloidal condition of the thin slop, this very valuable product could not be efficiently or economically recovered. However, under my process I can recover all of the vitamins present in the filtrate since the slop leaving the filters is free of suspended solids.

In the foregoing description I have purposed to disclose an improved method of processing cereals for increased fermentation efficiency and the rapid filtration and recovery of vitamins and other products from the dealcoholized slop. The method as described and disclosed does improve the over-all efficiency and economy of these processes by means which may be effectively controlled to produce higher uniform alcohol yields of uniform excellent quality, while permitting the recovery of valuable by-products which may be economically reclaimed from the residue slop. The following specific benefits are obtained through the use of my improved method:

Less power at the cookers.
Less power at the mash cooler pumps.
Less power at the fermenter pumps.
Less power at the fermenter electric agitator motors.
Less power at the beer pumps.
Less water for cooling in the mash coolers.
Less water for cooling in the yeast propagating tanks.
Less water for cooling in the fermenters.
Less water for condensing the distillate per unit of beer distilled.
Higher yields of alcohol.
Higher yields of purer alcohol.
Higher yields of purer alcohol of more uniformity.
A fermentation process in which all undesirable living micro-organisms and spores are eliminated.
Higher yeast inoculation and fermentation temperatures.
A more easily controlled fermenter temperature.
A more easily controlled yeast propagation and fermentation.
A shorter fermentation period.
A fermentation mash of higher concentration of fermentable substances.
A beer containing a higher alcohol content.
Less steam used at the stills for distillation.
Less water at the stills used to condense the alcoholic vapors.
A less complicated alcohol distilling and fractionating process.
Increased production per machine unit.
Increased production per man hour.
Increased production per machine unit and per man hour.
Distillery slop lacking conventional viscoidal character.
Free filtering distillery slop.
Drier filter press cake.
Less power used for drying.
Less steam used for drying.
Less man power used for drying.
Less power, less steam, increased machine unit production at lower labor cost.
Less power used at the slop pumps.
The recovery of valuable (ribo-flavin and other valuable vitamins) feed products, and combinations of the above operations.
Less difficulty at evaporators.
More capacity at evaporators.
More speed at evaporators.

*Starch balance sheet showing break-down of original substances (taken from bourbon grain bill)*

| | |
|---|---|
| Pounds dry substances into process | 100.00 |
| Pounds available dry substance extract in grain | 79.00 |
| Pounds absolute alcohol products produced in fermenter | 37.55 |
| Pounds carbon dioxide gas produced in fermenter | 39.87 |
| Pounds dry substance distillers' dried grains recovered | 14.11 |
| Pounds dry substance concentrated thin slop recovered | 8.47 |
| | 100.00 |

I claim:
1. The method of processing grains in the manufacture of alcohol for bourbon and rye whiskies to effect a de-alcoholized distillery grain slop which can be rapidly and economically separated into liquid and solid portions for the recovery of valuable by-products, which consists of the following steps: fine grinding all grains, mixing the corn and rye grains in water to make a mash, mixing the malt grains in water and formaldehyde to make a sterile diastase solution, separating the malt grains from the diastase solution, adding the separated malt grains to the mash and slowly raising the temperature to 160° F. to pre-liquefy the mash by enzymatic action of the malt grains, pressure cooking the mash by raising the temperature to over 300° F. to completely gelatinize the mixture and to kill bacteria, reducing the pressure and temperature of the cooked grain mash, adding the sterile diastase solution to convert the mash by enzymatic action, cooling and fermenting the mash, distilling the fermented material to leave a residue of de-alcoholized distillery grain slop, and rapidly filtering the whole slop in one pass to separate the material into distiller's grain cake containing all residue solids and a filtrate having substantially no suspended fines and containing substantially all yeast and grain solubles, and then evaporating the filtrate to obtain a ribo-flavin material.

2. The method of processing grains in the manufacture of alcohol for bourbon and rye whiskies to effect a de-alcoholized distillery grain slop which can be rapidly and economically separated into liquid and solid portions for the recovery of valuable by-products, which consists of the following steps: fine grinding all grains, mixing the corn and rye grains in water to make a mash, mixing the malt grains in water and formaldehyde to make a sterile diastase solution, separating the malt grains from the diastase solution, adding the malt grains to the mash and slowly raising the temperature to 160° F. to pre-liquefy the mash by enzymatic action of the diastase contained in the separated malt grains, pressure cooking the mash by raising the temperature to over 300° F. to completely gelatinize the starch contained in the mixture and to kill bacteria, reducing the pressure and temperature of the cooked grain mash, adding the sterile diastase solution to convert the mash by enzymatic action, cooling and fermenting the mash, distilling the fermented material to leave a residue of de-alcoholized distillery grain slop, all operations following pressure cooking being performed in a closed sterile system, and then rapidly filtering the whole slop in one pass into dry sterile distiller's grain cake containing all residue solids and a filtrate having substantially no suspended fines and containing substantially all yeast and grain solubles.

3. The method of processing grains in the manufacture of alcohol for bourbon and rye whiskies to effect a de-alcoholized distillery grain slop which can be rapidly and economically separated into liquid and solid portions for the recovery of valuable by-products, which consists of the following steps: grinding all grains into substantially fine granular particles, mixing the corn and rye grains in water to make a mash, adding a diastase solution to the mash and slowly raising the temperature to 160° F. to pre-liquefy the mash by enzymatic action of the diastase, pressure cooking the mash by raising the temperature to over 300° F. to completely gelatinize the starch contained in the mixture and to kill bacteria, reducing the pressure and temperature of the entire liquefied pressure cooked grain mash, adding sufficient sterile diastase solution to convert the mash by enzymatic action, cooling and fermenting the mash, distilling the fermented material to leave a residue of de-alcoholized distillery grain slop, rapidly filtering the whole slop in one pass to separate the material into distiller's grain cake containing all residue solids and a filtrate having substantially no suspended fines and containing substantially all yeast and grain solubles, and then evaporating the filtrate to obtain a ribo-flavin material.

4. The method of processing grains in the manufacture of alcohol to effect a de-alcoholized distillery grain slop which can be rapidly and economically separated into liquid and solid portions for the recovery of valuable by-products, which consists of the following steps: grinding all grains into substantially fine granular particles, mixing the corn and rye grains in water to make a mash, adding a diastase solution to the mash and slowly raising the temperature to 160° F. to pre-liquefy the mash by enzymatic action of the diastase, pressure cooking the mash by raising the temperature to over 300° F. to completely gelatinize the starch contained in the mixture and to kill bacteria, reducing the pressure and temperature of the entire liquefied pressure cooked grain mash, adding sufficient sterile diastase solution to convert the mash by enzymatic action, cooling and fermenting the mash, distilling the fermented material to leave a residue of de-alcoholized distillery grain slop, all operations following pressure cooking being performed in a closed sterile system, rapidly separating the whole slop in one pass into dry sterile distiller's grain cake containing all residue solids and a filtrate having substantially no suspended fines and containing substantially all yeast and grain solubles.

5. The method of processing grains in the manufacture of alcohol to effect a de-alcoholized distillery grain slop which can be rapidly and economically separated into liquid and solid portions for the recovery of valuable by-products, which consists of the following steps: grinding all grains into substantially fine granular particles, mixing the grains in water to make a mash, adding a starch modifying enzyme to the mash and slowly raising the temperature to 160° F. to pre-liquefy the mash by enzymic action, pressure cooking the mash by raising the temperature to over 300° F. to completely gelatinize the starch contained in the mixture and to kill bacteria, reducing the pressure and temperature of the entire liquefied pressure cooked grain mash, adding sufficient sterile starch modifying enzyme to convert the mash by enzymic action, cooling and fermenting the mash, distilling the fermented material to leave a residue of de-alcoholized distillery grain slop, rapidly separating the whole slop in one pass into dry sterile distiller's grain cake containing all residue solids and a filtrate having substantially no suspended fines and containing substantially all yeast and grain solubles.

HARRY G. ATWOOD.